(No Model.)

C. BOWMAN.
SAWMILL FEED MECHANISM.

No. 502,245.

2 Sheets—Sheet 1.

Patented July 25, 1893.

WITNESSES:
Walter G. Burns
E. V. Harris

Charles Bowman INVENTOR:

BY Chapin & Denny his ATTORNEYS.

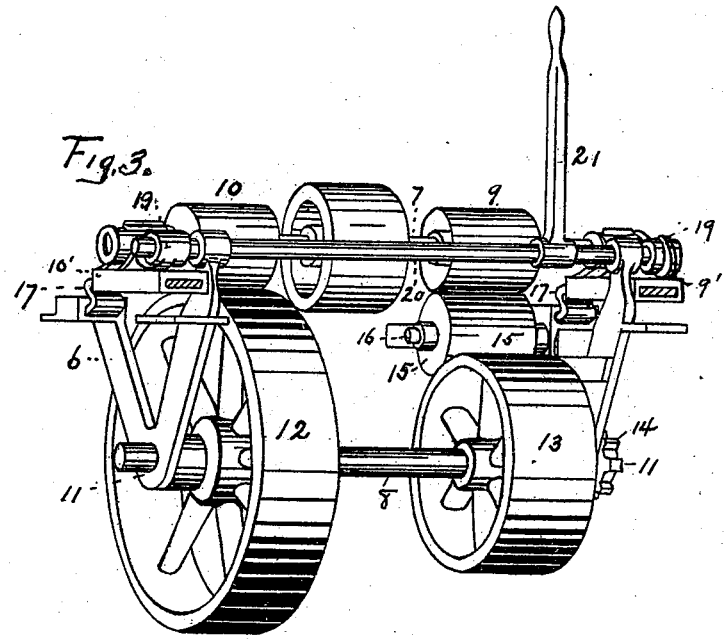

UNITED STATES PATENT OFFICE.

CHARLES BOWMAN, OF FORT WAYNE, INDIANA.

SAWMILL FEED MECHANISM.

SPECIFICATION forming part of Letters Patent No. 502,245, dated July 25, 1893.

Application filed December 28, 1892. Serial No. 456,608. (No model.)

*To all whom it may concern:*

Be it known that I, CHARLES BOWMAN, a citizen of the United States, residing at the city of Fort Wayne, in the county of Allen, in the State of Indiana, have invented certain new and useful Improvements in Sawmill Feed Mechanism; and I do hereby declare that the following is a full, clear, and exact description of the invention, which will enable others skilled in the art to which it appertains to make and use the same, reference being had to the accompanying drawings, which form part of this specification.

My invention relates to improvements in saw mill feed mechanism.

The object of my invention is to provide a cheap and substantial variable feed mechanism for saw mills, so constructed and arranged that the operator can readily and conveniently vary the speed of the log carriage, start or stop the same and in short regulate and control at pleasure all the movements of the said carriage by the use of but one operating lever, which is accomplished by varying the pressure of a friction pulley upon the periphery of the driving pulley.

My invention consists of a pair of vertical braces or hangers provided with suitable journal bearings, and proper horizontal supports, a driving shaft mounted in said hangers carrying a pair of driving pulleys of unequal diameter, and having a rigid pinion on one end thereof adapted to engage the rack bar on the log carriage, an operating shaft mounted in said hangers, having a cam or eccentric upon the ends thereof and provided with an operating handle, horizontal spring plates mounted in said hangers and provided with journal boxes or bearings for the power shaft, a power shaft revolubly mounted in said bearings, said shaft carrying an operating pulley at or near its center, and two friction pulleys near either extremity thereof, and an intermediate pulley mounted in one of the said hangers and adapted to transmit the motion of one of the said friction pulleys to the said driving shaft.

The novel feature of my invention consists of the construction and arrangement of the several parts whereby the operator is enabled to vary, regulate and control the movements of the carriage by the use of but one operating lever.

The object of my invention is accomplished by the mechanism illustrated in the accompanying drawings forming part of this specification, in which similar figures of reference indicate corresponding parts in the several views.

Figure 1:
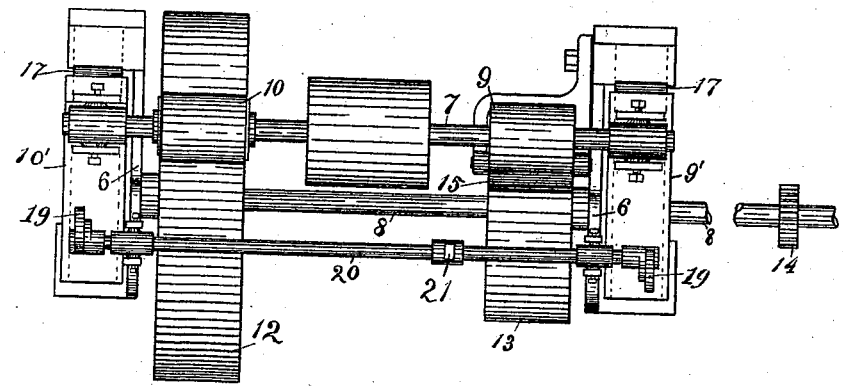
Figure 2:
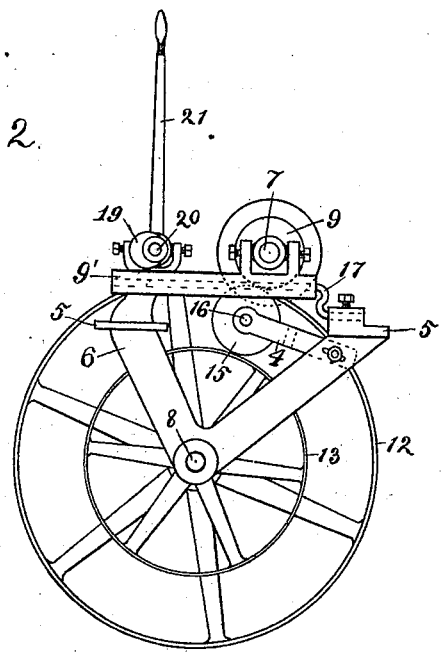

Figure 1 is a plan view of my invention showing the relative position and arrangement of the different pulleys mounted on the power and driving shafts, and also showing the eccentrics upon the operating shaft. Fig. 2 is an end view of the same with the small pinion cut away, and looking toward the smaller driving pulley. Fig 3, is a perspective of my improvement showing another view of the friction pulleys and of the operating shaft.

The V-shaped brackets or hangers 6, of any suitable form, size or material, preferably of metal, having a suitable bearing 11 for the driving shaft 8, proper bearings at the upper extremity of one of the vertical arms for the operating shaft 20, and proper horizontal supports 5 upon each arm thereof, is also provided with horizontal springs 17, firmly secured thereto at one end by a set screw or other proper manner, the other end of the said spring being free, as seen in Figs. 2 and 3. The said springs are preferably inclosed or surmounted by the metallic plates 9' and 10', which plates are provided with any proper journal boxs or bearings for the extremities of the power shaft 7, as seen in Figs. 1 and 2.

In the bearings 11 is mounted the driving shaft 8 upon which is rigidly mounted the driving pulleys 12 and 13, preferably of metal, of different diameters, the power to feed the log carriage being transmitted through the large pulley 12, while the power to return the said carriage is transmitted through the small pulley 13.

Upon one end of the shaft 8 is fixed a small pinion 14 which is adapted to engage the rack bar of the log carriage, in a well known manner.

Rigidly secured to one arm of the bracket 6 is an oblique bracket 4, Fig. 2, in which is properly arranged the horizontal shaft 16, upon which is revolubly mounted an intermediate pulley 15 in contact with the driving pulley 13. In the said journal boxes or bearings on the spring plates 9' and 10' is revolubly mounted the power shaft 7 having a central pulley, preferably of metal, fixed thereon, which pulley receives the power through a belt trained upon it in a well known manner. At proper points on the said shaft and upon either side of said central pulley is rigidly secured, in any proper manner the friction pulleys 9 and 10, the said pulley 10 being preferably constructed of paper, leather or other proper material and adapted to engage the large driving pulley 12, the said pulley 9 being preferably of metal and adapted for engagement with the intermediate pulley 15, preferably constructed of paper or leather. The said friction pulleys 9 and 10 are so arranged upon the shaft 7 as to be very near to but not in actual engagement with the pulleys 15 and 12 respectively, when in their normal position, as seen in Figs. 1 and 2.

In suitable bearings in one of the arms of the said hangers 6 is revolubly mounted the operating shaft 20, having an operating handle 21 and provided upon its extremities with the eccentrics or feet 19 having bearings on the said spring plates. These feet or eccentrics are diametrically opposite, one foot extending inwardly and the other foot extending outwardly, so that when the shaft 20 is turned in one direction, one of the said feet will depress the spring plate on which it bears, while the other foot or eccentric is, by the same motion, raised from its seat, and so alternately. Thus, it is obvious that when the operator moves the operating handle 21 one way the friction pulley 10 is brought into contact with the large pulley 12, thereby revolving the same, which in turn moves the said carriage toward the saw. And by moving the said handle in the opposite direction the friction pulley 10 is disengaged from the large pulley and the other friction pulley 9 is brought into engagement with the small pulley 13, by means of the intermediate pulley 15, thereby revolving said driving pulleys in the reverse direction and thus returning the carriage.

Of course, it is apparent that when the operating handle 21 is free, both of said friction pulleys are raised by the said spring plates out of engagement.

Having thus described my invention and the manner of operating the same, what I claim as new and useful, and desire to secure by Letters Patent, is—

1. In a saw mill feed mechanism, the combination of brackets or hangers having suitable journal bearings for horizontal shafts, a driving shaft revolubly mounted in said hangers and carrying two driving pulleys of different diameters, and having a pinion at one end thereof adapted to engage the rack bar of a log carriage, two pulleys of different diameters rigidly mounted upon said driving shaft, an intermediate pulley revolubly mounted and in contact with the smaller of said driving pulleys, a power shaft mounted in vertically movable bearings and provided with an operating pulley, and two friction pulleys mounted on said shaft, near to but not in actual engagement with said intermediate pulley and large pulley respectively with two spring plates secured to said hangers adapted to support the power shaft, and an operating shaft mounted in said hangers, provided with an operating handle and having eccentrics on both ends thereof, and adapted for engaging the free ends of said spring plates to bring the said friction pulleys into engagement with the said intermediate pulley or the said larger driving pulley, as described.

2. The combination in a saw mill feed mechanism, of a driving shaft properly mounted in supporting brackets, having a pinion for engaging the rack bar of a log carriage, and provided with large and small pulleys; an intermediate pulley revolubly mounted and in contact with said small pulley, spring plates secured at one end in said brackets and provided with suitable journal bearings for the power shaft, a power shaft revolubly mounted in said bearings and provided with an operating pulley; friction pulleys mounted on said power shaft not quite in contact with said intermediate pulley and large pulley respectively, and means for depressing the said spring plates independently of each other at the will of the operator, all substantially as described.

3. In a saw mill feed mechanism, operated by friction pulleys, the combination of vertically moving journal bearings supporting the power shaft, with means to suspend the said bearings and means to depress the same separately and independently of each other; a power shaft provided with friction pulleys, and pulleys operating a driving shaft in alternate directions, all as set forth and described.

4. The combination, in a saw mill feed mechanism operated by friction pulleys, of the springs 17 having vertically movable bearing plates 9' and 10' provided with proper journal boxes, a power shaft 7 having an operating pulley mounted thereon; the friction pulleys 9 and 10 rigidly mounted on said shaft an operating shaft 20 provided with an operating handle 21 and having upon the extremities thereof the eccentrics or feet 19 adapted to depress the said plates separately and independently of each other, all substantially as set forth and described.

In testimony whereof I hereunto subscribe my name, in the presence of two witnesses, this 16th day of December, A. D. 1892.

CHARLES BOWMAN.

Witnesses:
ALBERT BAKER,
WARREN SWEET.